(12) United States Patent
Serocki

(10) Patent No.: US 11,116,197 B2
(45) Date of Patent: Sep. 14, 2021

(54) ROTATING SWIVEL ASSEMBLIES FOR OUTRIGGERS

(71) Applicant: TACO METALS, LLC, Miami, FL (US)

(72) Inventor: Philip J. Serocki, Sparta, TN (US)

(73) Assignee: Taco Metals, LLC, Miami, FL (US)

( * ) Notice: Subject to any disclaimer, the term of this patent is extended or adjusted under 35 U.S.C. 154(b) by 914 days.

(21) Appl. No.: 15/266,612

(22) Filed: Sep. 15, 2016

(65) Prior Publication Data

US 2017/0071178 A1 Mar. 16, 2017

Related U.S. Application Data

(60) Provisional application No. 62/218,607, filed on Sep. 15, 2015.

(51) Int. Cl.
*A01K 91/08* (2006.01)
*B63B 35/14* (2006.01)

(52) U.S. Cl.
CPC ............... *A01K 91/08* (2013.01); *B63B 35/14* (2013.01)

(58) Field of Classification Search
CPC ...... A01K 91/08; A01K 91/053; B63B 17/00; B63B 35/14
USPC ............... 43/27.4, 43.12, 43.13, 42.74, 27.2; 114/255, 364; 242/157 R, 157.1, 615, 242/615.1, 615.12, 615.2, 615.21; 226/196.1
See application file for complete search history.

(56) References Cited

U.S. PATENT DOCUMENTS

| | | | | |
|---|---|---|---|---|
| 1,835,310 | A * | 12/1931 | Kline | A01K 87/04 43/24 |
| 1,970,624 | A | 8/1934 | Recker | |
| 2,113,707 | A * | 4/1938 | Montgomery | A01K 87/04 254/390 |
| 2,305,176 | A * | 12/1942 | Littman | A01K 91/02 43/19 |
| 2,324,353 | A * | 7/1943 | Berry | A01K 87/04 43/24 |
| 2,452,788 | A * | 11/1948 | Peters | A01K 87/025 43/18.1 CT |
| 2,620,586 | A * | 12/1952 | Seifert | A01K 91/08 43/24 |
| 2,652,654 | A * | 9/1953 | Bahn | A01K 87/04 43/24 |

(Continued)

FOREIGN PATENT DOCUMENTS

EP 0085792 A1 * 8/1983 ........... A01K 87/025
EP 0345401 A1 12/1989
(Continued)

OTHER PUBLICATIONS

Translation of JP 2009-284780 (Year: 2009).*
(Continued)

*Primary Examiner* — Darren W Ark
(74) *Attorney, Agent, or Firm* — Robert M. Schwartz; Alfred K. Dassler

(57) ABSTRACT

An outrigger assembly includes an outrigger tube with a longitudinal axis. A swivel ring is disposed on the outrigger tube. The swivel ring is rotatable with respect to the outrigger tube about the longitudinal axis. The swivel ring has a line guide for guiding an outrigger rigging line in a direction along the longitudinal axis.

6 Claims, 11 Drawing Sheets

(56) References Cited

U.S. PATENT DOCUMENTS

| | | | | |
|---|---|---|---|---|
| 2,805,509 | A | * | 9/1957 | De Witt .................. A01K 87/04 43/24 |
| 2,838,866 | A | * | 6/1958 | Labin ..................... A01K 87/04 43/25 |
| 2,878,608 | A | * | 3/1959 | O'Brien, Jr. ........... A01K 87/04 43/24 |
| 3,063,668 | A | | 11/1962 | Yohe |
| 3,103,375 | A | | 9/1963 | McMullin |
| 3,165,856 | A | * | 1/1965 | Gourley, Jr. ........... A01K 87/04 43/24 |
| 3,303,595 | A | * | 2/1967 | Wells ..................... A01K 87/00 43/24 |
| 3,350,809 | A | * | 11/1967 | Chion .................... A01K 87/04 43/24 |
| 3,358,399 | A | * | 12/1967 | Waldmann ............. A01K 91/02 43/24 |
| 3,641,696 | A | * | 2/1972 | Fleischer ............... A01K 87/04 43/24 |
| 3,899,846 | A | * | 8/1975 | Sanchez ................. A01K 87/00 43/43.12 |
| 3,937,415 | A | * | 2/1976 | Prinz .................. A01K 89/0165 242/396.1 |
| 3,961,437 | A | * | 6/1976 | Lewis .................... A01K 91/08 43/27.4 |
| 3,967,405 | A | * | 7/1976 | Henze ................ A01K 89/0165 43/27.4 |
| 3,968,587 | A | * | 7/1976 | Kammeraad .......... A01K 91/08 43/27.4 |
| 3,977,118 | A | * | 8/1976 | Seymour ................ A01K 91/08 43/21.2 |
| 4,050,180 | A | * | 9/1977 | King ...................... A01K 91/08 242/396.9 |
| 4,167,829 | A | * | 9/1979 | Henze .................... A01K 91/08 43/24 |
| 4,300,303 | A | * | 11/1981 | Hutson .................. A01K 87/00 43/24 |
| 4,428,141 | A | * | 1/1984 | Kovalovsky ........... A01K 87/04 242/157 R |
| 4,445,293 | A | * | 5/1984 | Ohmura ................. A01K 87/04 43/24 |
| 4,807,385 | A | * | 2/1989 | Morishita .............. A01K 87/04 43/24 |
| 4,907,347 | A | * | 3/1990 | Pease ..................... A01K 91/08 33/713 |
| 4,928,420 | A | * | 5/1990 | Jackson ................. A01K 91/08 43/27.4 |
| 4,932,602 | A | * | 6/1990 | Scott ...................... A01K 91/08 242/250 |
| 5,205,061 | A | * | 4/1993 | Echols, Jr. ........... A01K 97/125 43/17.5 |
| 5,276,991 | A | * | 1/1994 | Stotesbury ............. A01K 87/04 43/24 |
| 5,383,300 | A | * | 1/1995 | Stotesbury ............. A01K 87/04 43/24 |
| 5,417,007 | A | * | 5/1995 | Stotesbury ............. A01K 87/04 43/24 |
| 5,458,305 | A | | 10/1995 | Woodward |
| 5,531,041 | A | * | 7/1996 | Betto ..................... A01K 87/04 43/24 |
| 5,644,864 | A | * | 7/1997 | Kelly ................... A01K 87/007 43/17.5 |
| 5,855,084 | A | * | 1/1999 | Huddleston .......... A01K 87/007 43/17 |
| 5,921,196 | A | * | 7/1999 | Slatter ................... A01K 91/08 114/255 |
| 5,924,235 | A | | 7/1999 | McCulley et al. |
| 5,974,722 | A | | 11/1999 | Kiser |
| 5,992,804 | A | | 11/1999 | Johnson |
| 6,061,946 | A | * | 5/2000 | Toelken ............... A01K 87/007 43/24 |
| 6,446,380 | B1 | * | 9/2002 | Radosavljevic ..... A01K 87/007 43/16 |
| 6,546,665 | B1 | * | 4/2003 | Eldredge ............. A01K 87/007 43/17.5 |
| 6,637,363 | B2 | | 10/2003 | Schmitt et al. |
| 7,025,015 | B2 | * | 4/2006 | Wilcox .................. A01K 91/08 114/255 |
| 7,111,574 | B2 | * | 9/2006 | Slatter ................... A01K 91/08 114/255 |
| 7,814,812 | B1 | | 10/2010 | Ziegahn et al. |
| 7,913,442 | B2 | * | 3/2011 | Roth ...................... A01K 87/04 43/24 |
| 8,104,219 | B1 | * | 1/2012 | Pace .................... A01K 87/007 43/17 |
| 8,109,034 | B1 | * | 2/2012 | McCauley ............. A01K 91/08 43/27.2 |
| 8,166,699 | B1 | * | 5/2012 | Egan, Jr. ................ A01K 91/08 43/24 |
| 8,176,674 | B2 | * | 5/2012 | Lin ........................ A01K 87/04 242/157 R |
| 8,347,546 | B2 | * | 1/2013 | Rupp .................... A01K 87/025 248/255 |
| 8,422,716 | B2 | | 4/2013 | Wetzel |
| 8,656,632 | B1 | * | 2/2014 | Mercier ................. A01K 91/08 43/27.4 |
| 8,683,735 | B1 | * | 4/2014 | Figari .................... A01K 91/08 43/18.1 CT |
| 9,125,391 | B2 | * | 9/2015 | Egan, Jr. ................ A01K 87/04 |
| 9,504,239 | B2 | * | 11/2016 | Stender ................ A01K 87/025 |
| 10,136,629 | B1 | * | 11/2018 | Walrath ................ A01K 97/10 |
| 10,337,547 | B2 | * | 7/2019 | Onorato |
| 10,470,451 | B2 | * | 11/2019 | Onorato ............... A01K 87/025 |
| 10,575,512 | B2 | * | 3/2020 | Bridgewater ......... A01K 91/08 |
| 2004/0016385 | A1 | * | 1/2004 | Wilcox .................. A01K 91/08 114/255 |
| 2006/0090388 | A1 | * | 5/2006 | Lee ........................ A01K 87/04 43/24 |
| 2006/0231009 | A1 | * | 10/2006 | Slatter ................... A01K 91/08 114/255 |
| 2008/0250691 | A1 | * | 10/2008 | Barnes ................. A01K 87/007 43/17 |
| 2013/0097914 | A1 | * | 4/2013 | Barber .................. A01K 87/04 43/24 |
| 2017/0086442 | A1 | * | 3/2017 | Onorato ................ A01K 97/10 |
| 2017/0089374 | A1 | * | 3/2017 | Onorato ................ F16B 7/1418 |
| 2018/0014522 | A1 | * | 1/2018 | Bridgewater ......... F16B 7/1418 |
| 2019/0159438 | A1 | * | 5/2019 | Stirling ................. A01K 87/04 |

FOREIGN PATENT DOCUMENTS

| | | | | |
|---|---|---|---|---|
| EP | 2749161 | A4 | * | 6/2015 |
| FR | 2064582 | A5 | * | 7/1971 .......... A01K 87/025 |
| FR | 2102702 | A5 | * | 4/1972 ............. A01K 87/04 |
| FR | 2263686 | A2 | * | 10/1975 ............. A01K 87/04 |
| FR | 2607666 | B1 | * | 6/1989 ............. A01K 87/04 |
| FR | 2696900 | A1 | | 4/1994 |
| GB | 684671 | A | | 12/1952 |
| GB | 2085271 | A | * | 4/1982 ............. A01K 87/04 |
| GB | 2260471 | B | * | 11/1994 ............. A01K 87/04 |
| JP | 7007726 | Y2 | * | 3/1995 |
| JP | 7013495 | Y2 | * | 4/1995 |
| JP | 07308143 | A | * | 11/1995 |
| JP | 08051895 | A | | 2/1996 |
| JP | 2516028 | Y2 | * | 11/1996 ............. A01K 87/00 |
| JP | 08308439 | A | * | 11/1996 |
| JP | 09107849 | A | * | 4/1997 |
| JP | 2598499 | Y2 | * | 8/1999 |
| JP | 2603120 | Y2 | * | 2/2000 |
| JP | 3147454 | B2 | * | 3/2001 ............. A01K 87/04 |
| JP | 2001057829 | A | | 3/2001 |
| JP | 2001069879 | A | | 3/2001 |
| JP | 3443098 | B2 | * | 9/2003 |
| JP | 2004337105 | A | * | 12/2004 |
| JP | 2006191833 | A | * | 7/2006 |
| JP | 3844541 | B2 | | 11/2006 |
| JP | 2009284780 | A | * | 12/2009 |
| JP | 5555419 | B2 | * | 7/2014 |
| JP | 5950640 | B2 | * | 7/2016 |
| KR | 101022108 | B1 | * | 3/2011 |

(56) References Cited

FOREIGN PATENT DOCUMENTS

OTHER PUBLICATIONS

Translation of FR 2607666 (Year: 1989).*
Translation of JP 07-308143 (Year: 1995).*
Translation of FR 2102702 (Year: 1972).*
Taco Marine Sport Fishing-Product Specifiction for Carbon Fiber center Rigger Pole (p. 1) and Carbon Fiber Tele-Outrigger Pole (p. 2).

* cited by examiner

ROTATING SWIVEL ASSEMBLIES FOR OUTRIGGERS

CROSS REFERENCE TO RELATED APPLICATIONS

This application claims benefit of U.S. Provisional Patent Application No. 62/218,607 filed Sep. 15, 2015, entitled Roller Outrigger, the disclosure of which is incorporated herein by reference in its entirety.

BACKGROUND OF THE INVENTION a) Field of the Invention

The invention relates to rigging line guides and roller assemblies on an outrigger pole or tube used for fishing and trolling from fishing vessels, the outrigger tube being a single tube or series of telescoping tubes that support a fishing line to allow boats to trawl more than one fishing line in the water without tangling, having a wider spread of trolling lures and to simulate a school of fish.

b) Description of the Related Art

It is well known to use outrigger poles or tubes in fishing vessels. Outrigger tubes are a long tube or a series of tubes, one within another, for extending or telescoping the outrigger tube, both referred to herein as an outrigger tube. The bottom or proximal end of the outrigger tube being secured to a base attached, for example, to the fishing vessel or a portion of the vessel such as a T-top or transom of the vessel.

Each outrigger tube has a continuous lanyard or rigging line extending in a direction along the longitudinal axis of the outrigger tube. The rigging line runs through one or more line guides which may be pulleys or eyelets for guiding the rigging line. Line guides may be located at the top, middle and/or bottom of the outrigger pole. A release clip, attached to the rigging line, releasably holds a fishing line. As is known in the art, the release clip is brought to or in proximity of the proximal end of the outrigger pole, so a user can attach a fishing line to the release clip. Then the rigging line is moved through the line guides so that the release clip can be positioned at or near the tip or distal end of the outrigger tube, or at some proximal position between the distal end of the outrigger tube and proximal end of the outrigger tube. In similar manner, the rigging line can be moved along the line guides to return the release clip to the proximal end of the outrigger tube.

Typically, the line guides that support the rigging line are rigidly fixed to the outrigger tube at a radial angle such that the center portion of the line guides are aligned along the same radial angle relative to the longitudinal axis of the outrigger tube. Therefore, when the outrigger tube is fixed in the base attached to the vessel, the radial angle of the centers of the line guides relative to the vessel and to the water is fixed. When trolling, a user must then, if possible, re-adjust the radial angle of the line guides relative to the water if the radial angle of the pulleys or eyelets was not a desired or preferred angle for trolling.

More than one fishing line may be used on the same outrigger tube. This is accomplished with using additional rigging lines within one or more of the line guides on the same outrigger tube. This further increases the number of fishing lines used for trolling in the water.

SUMMARY OF THE INVENTION

It is accordingly an object of the invention to provide an outrigger assembly having a rotating line guide which overcomes the above-mentioned disadvantages of the heretofore-known devices and methods of this general type and which provides an outrigger tube having a rigging line that is effective for trolling and allows the rigging lines to rotate into a low strain position during rocking motion of the vessel, the rotating line guide reduces rigging line wear.

With the foregoing and other objects in view there is provided an outrigger assembly includes an outrigger tube with a longitudinal axis. A swivel ring is disposed on the outrigger tube. The swivel ring is rotatable with respect to the outrigger tube about the longitudinal axis. The swivel ring has a line guide for guiding an outrigger rigging line in a direction along the longitudinal axis.

In accordance with another feature of the invention, the swivel ring is axially retained on the outrigger tube for limiting a movement of the swivel ring in a direction along the longitudinal axis.

In accordance with an added feature of the invention, the assembly has a swivel ring bearing disposed on the outrigger tube, the swivel ring bearing defining an annular channel for receiving the swivel ring and axially retaining the swivel ring therein.

In accordance with an additional feature of the invention the line guide is a guide roller.

In accordance with yet an additional feature of the invention, the roller is a u-shaped or v-shaped roller.

In accordance with yet another added feature of the invention, the swivel ring bearing has an annular shoulder and an annual groove receiving a retaining ring therein. The annular shoulder and the retaining ring define sidewalls of the channel.

In accordance with still another added feature of the invention, the outrigger assembly has a further swivel ring disposed at a free end of the outrigger tube. The further swivel ring is rotatable with respect to the outrigger tube about the longitudinal axis. The further swivel ring has a second line guide for guiding the outrigger rigging line in the direction along the longitudinal axis.

In accordance with still another added feature of the invention, the outrigger assembly has a further swivel ring bearing disposed at the free end of the outrigger tube. The further swivel ring bearing defines a second annular channel for receiving the further swivel ring and axially retaining the further swivel ring therein.

In accordance with still another added feature of the invention, the outrigger assembly has a conical tip fastened to the further swivel ring bearing.

Other features which are considered as characteristic for the invention are set forth in the appended claims.

Although the invention is illustrated and described herein as embodied in the outrigger assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
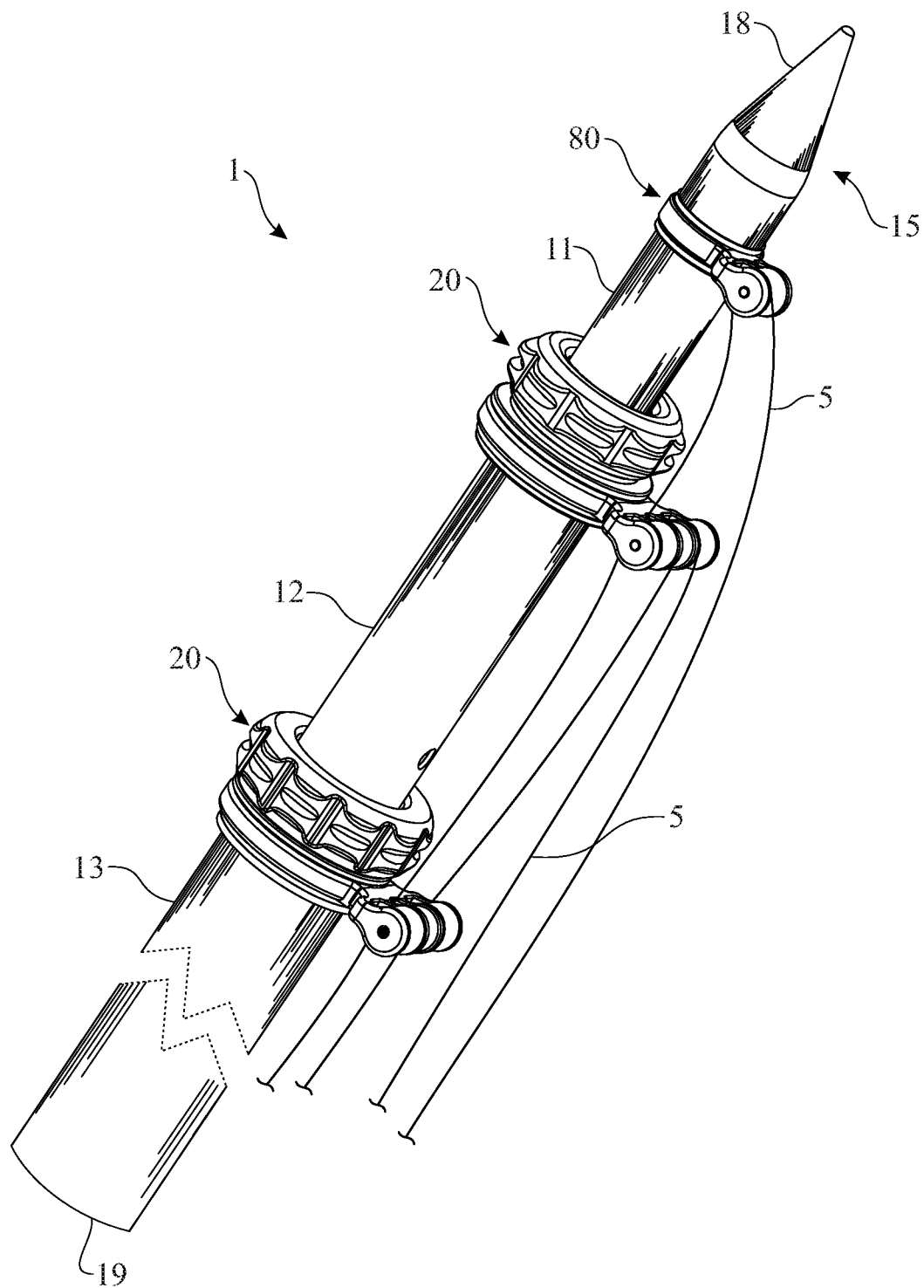
FIG. 1A is a perspective view of an outrigger tube assembly in a slightly extended position with three line guide assemblies.
Figure 1B:
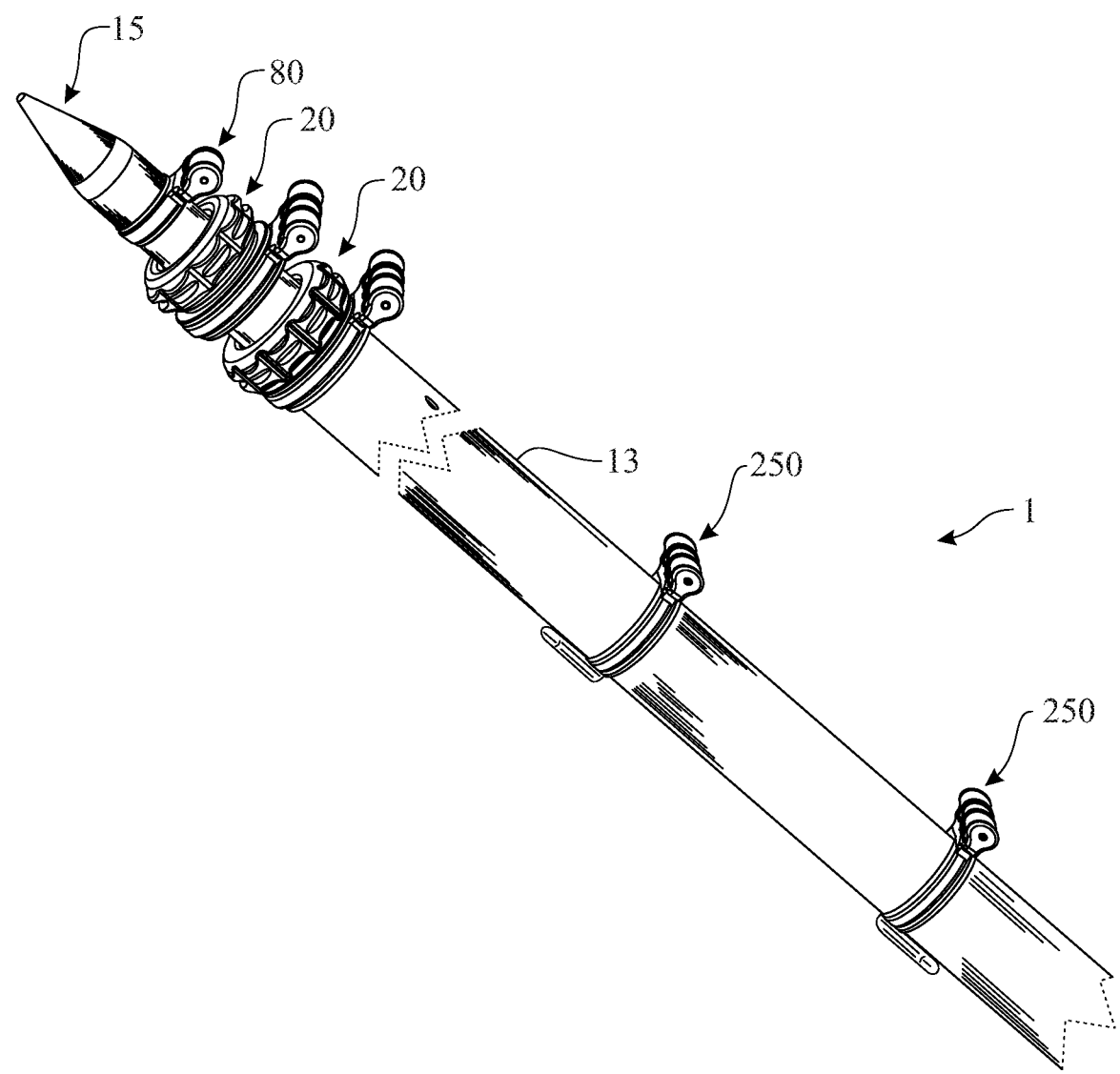
FIG. 1B is a perspective view of the outrigger tube assembly of FIG. 1A in a storage/traveling position with a rigging line caddy.
Figure 2:
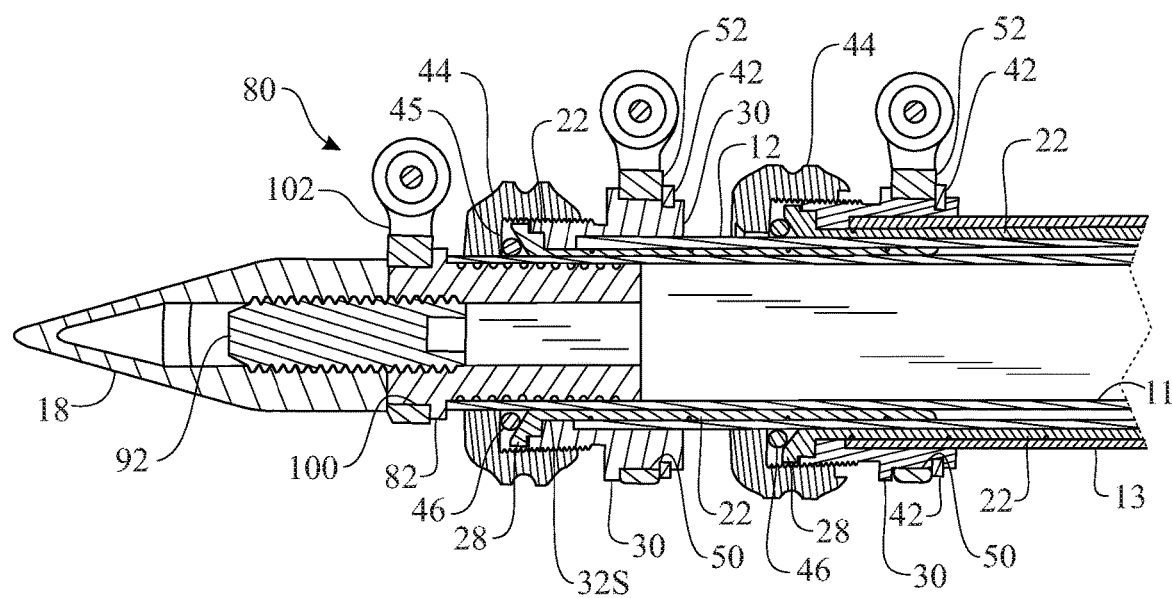
FIG. 2 is an enlarged partial cross section view of the outrigger tube assembly taken longitudinally at a free end of FIG. 1B.

Referring now to the figures of the drawing in detail and first, particularly to FIGS. 1A and 1B which show an outrigger assembly 1, having three telescoping tubes, which include an outer tube 13 with a center tube 12 longitudinally displaceable therein and an inner tube 11 longitudinally displaceable within the center tube 12. Respective outrigger tube bearings 22 are disposed between the inner tube 11 and the center tube 12 and between the center tube 12 and the outer tube 13. As shown in FIG. 2, the outrigger tube bearings 22 provide the guidance for the telescoping extension of the tubes 11 and 12. The inner tube 11 has an outrigger tip 18 at a free end 15 and outer tube 13 has a base end/outrigger butt 19 of the outrigger assembly 1, which is disposed in an outrigger mount on a fishing vessel.

Figures 3, 3A:
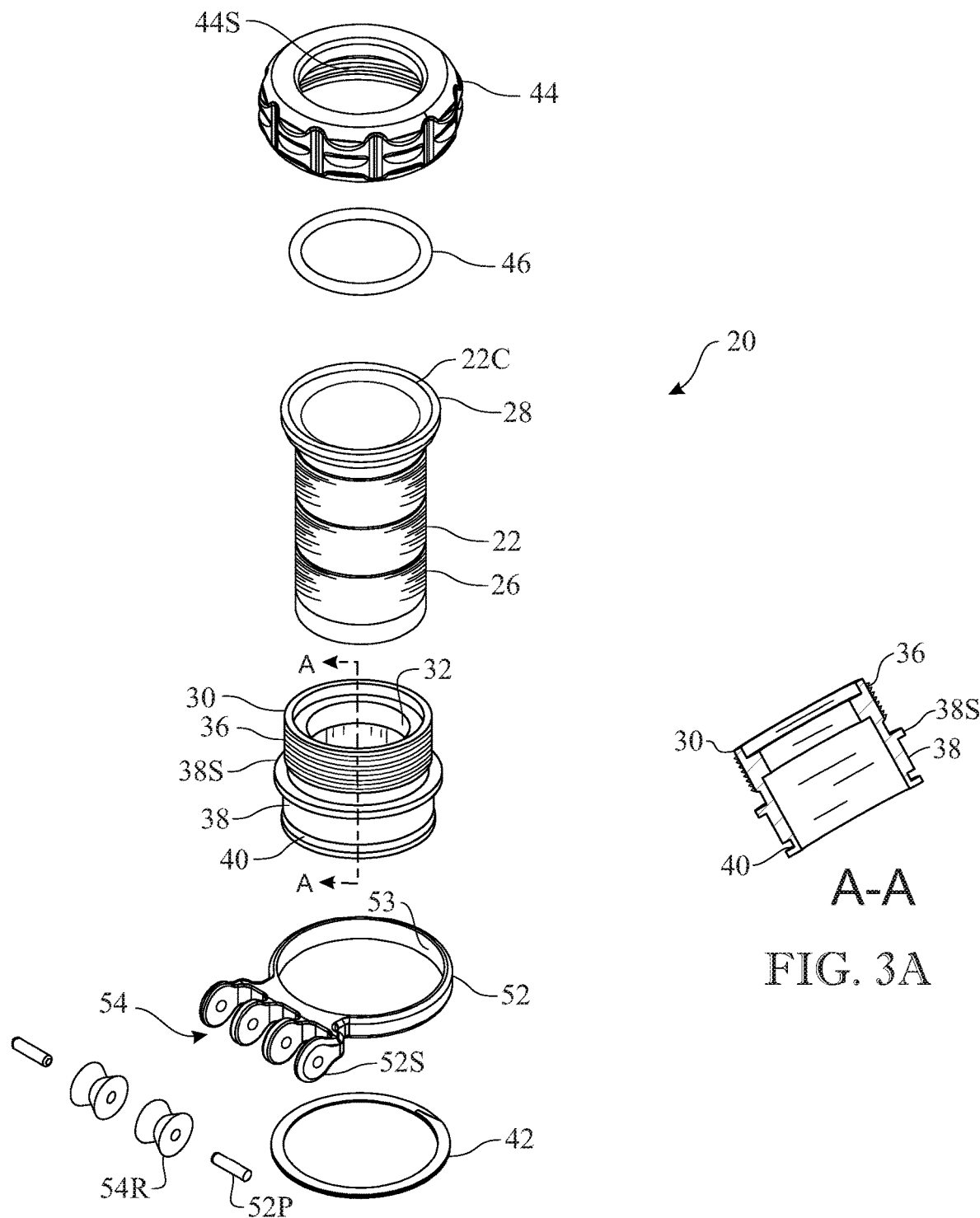
FIG. 3 is an exploded view in perspective of a rigging line guide assembly.
FIG. 3A is an enlarged view of detail "A" in FIG. 3.
Figure 4:
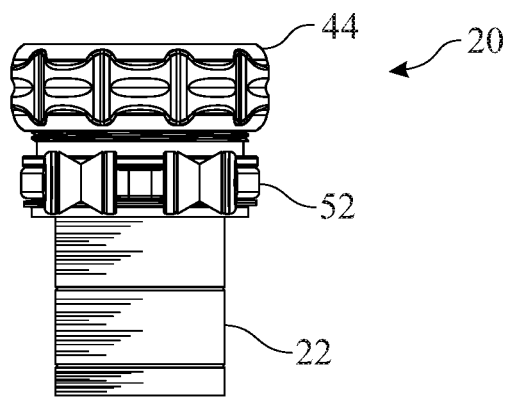
FIG. 4 is a front view of the rigging line guide assembly of FIG. 3.
Figure 5:
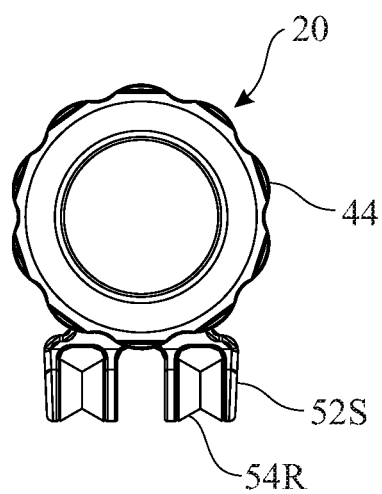
FIG. 5 is a top plan view of the rigging line guide assembly of FIG. 3.
Figure 6:
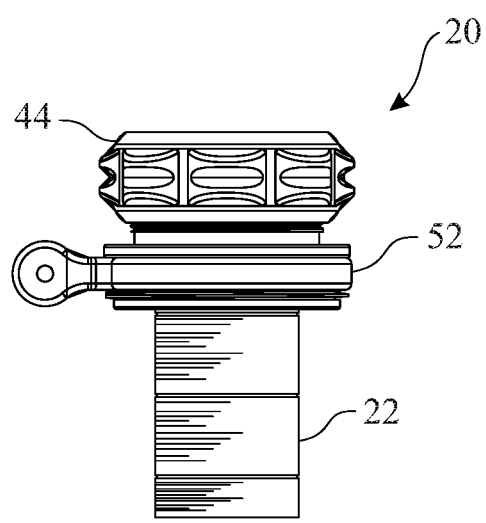
FIG. 6 is a side view of the rigging line guide assembly of FIG. 3.

Rigging line guide assemblies 20 are shown at the junctions between the respective tubes 11, 12, and 13. An exploded view of a line guide assembly is shown in FIG. 3. The outrigger tube bearing 22 provided with a flange 28 and an outer diameter 26 that slides into a corresponding one of the tubes. A swivel ring bearing 30 has an inside diameter 32 that is secured to an outside diameter of a corresponding tube by adhesive at an end of the tube. As best seen in FIG. 2, the inside diameter 32 is provided with a step 32s that abuts an end face of the corresponding tube on one side and the flange 28 of the outrigger tube bearing 22 on an opposite side. The swivel ring bearing 30 is provided with an external (male) threaded portion 36 that receives a retainer cap 44 having a corresponding internal (female) threaded portion 44s. The outrigger tube bearing 22 is provided with a chamfer 22c at and end thereof, the chamfer 22c receives an o-ring 46. When the retainer cap 44 is threaded onto the swivel ring bearing 30, the outrigger tube bearing is retained within the corresponding tube by a collar 45 of the retainer cap 44. Furthermore, the collar 45 compresses the o-ring 46 against the chamfer 22c, which causes the o-ring to exert pressure on the tube being guided by the outrigger tube bearing, this in turn prevents the guided tube from sliding freely so that the positions of the telescoping tube are reliably maintained during use and storage of the outrigger assembly 1.

The swivel ring bearing 30 is provided with an external bearing surface 38 which serves as a bearing for a swivel ring 52 via an internal bearing surface 53 thereof. The swivel ring 52 includes a line guide 54 for a rigging line 5 of the outrigger assembly 1. The line guide 54 may be ring-shaped, as is known in the art, or may include rollers 54R that provide for unhindered/free movement of the rigging line 5. The rollers 54R may be provided as v-shaped or u-shaped rollers that guide the rigging line 5 to the center of the roller. In instances when a swivel ring 52 has multiple rollers 54R (as will be discussed below) each roller 54R of the multiple roller swivel ring 52 is individually rotatable (i.e. each roller can rotate without causing adjacent roller(s) to rotate). This allows independent movement of each rigging line 5 for individually setting and adjusting the positions of each rigging line 5. To this end the swivel ring 52 is provided with roller supports 52s that are each provided with an opening for receiving pin(s) 52p that mount the rollers 54R between the supports 52s. The supports 52s delimit the rollers 54R from one another to prevent rigging lines 5 from tangling or crossing one another.

The external bearing surface 38 is delimited by a shoulder 38s on one side thereof and the swivel ring bearing 30 is provided with a groove 40 for receiving a retaining ring 42 on an opposite side of the bearing surface 38. Accordingly, the external bearing surface 38, the shoulder 38s and the retaining ring 42 define a channel 50 in which the swivel ring 52 is axially retained with respect to the longitudinal direction of the outrigger assembly 1.

The external bearing surface 38 and the internal bearing surface 53 are polished to facilitate the free rotation of the swivel ring 52. Applicant discovered that the concept of the rotation of swivel ring 52 allows baits that are being trolled to move through the water in a smoother manner without skipping or jumping out of the water especially during wavy conditions. The above additionally solves the problem of tangling or looping of the fishing lines attached to the rigging lines that occurs when baits do skip out of the water and fly forward through the air towards the vessel and the outrigger assembly. Likewise, the rotating swivel ring accommodates different fishing line scopes which result from the distance the baits are set from the vessel.

Figure 7:
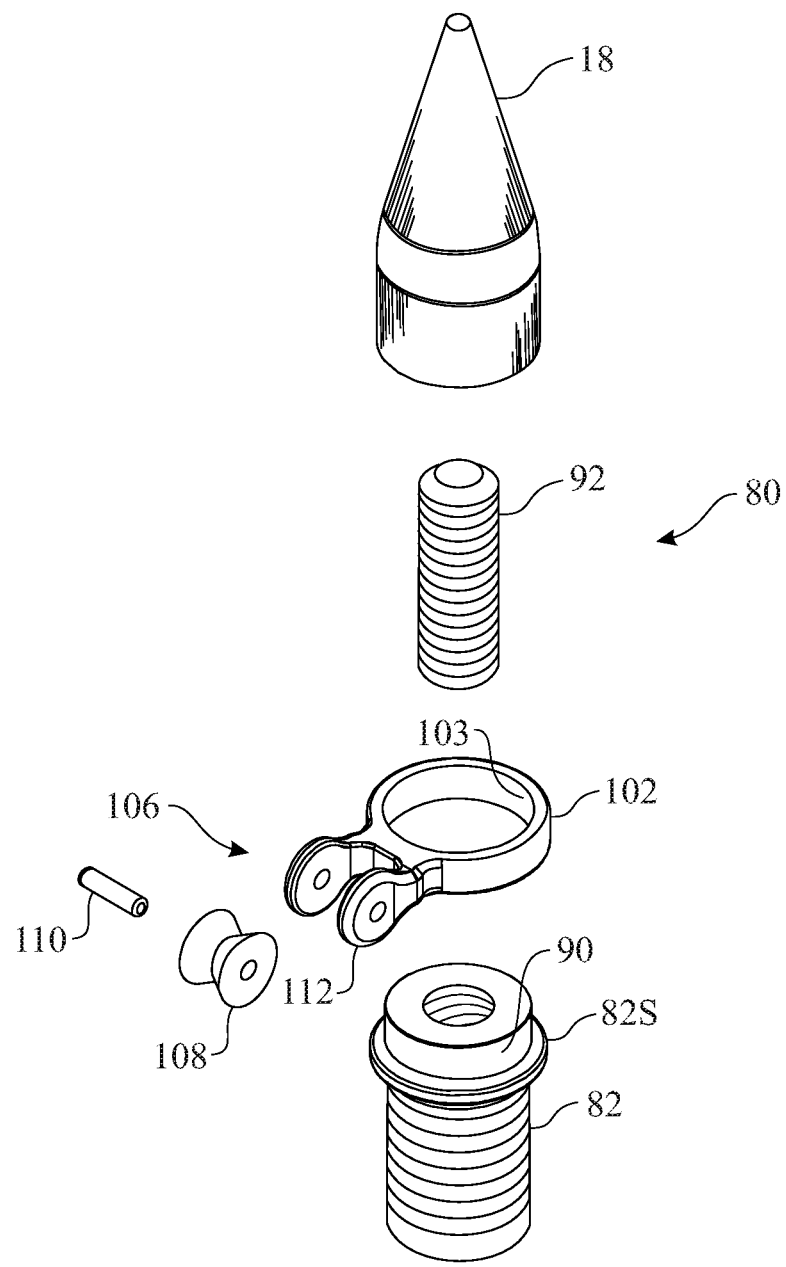
FIG. 7 is an exploded view in perspective of a tip assembly of an outrigger tube.

FIG. 7 shows an exploded view of a tip assembly 80 of the outrigger assembly. The tip assembly 80 includes a tip swivel ring bearing 82 that is disposed at a free end of the inner tube 11. The tip swivel ring bearing 82 has an external thread for engaging an inner diameter of the inner tube 11. The tip swivel ring bearing 82 has a shoulder 82s that abuts an end of the inner tube 11 and axially locates the tip swivel ring bearing 82 in the inner tube 11. The tip swivel ring bearing 82 has an outside diameter that defines a bearing surface 90 for an inside diameter of 103 of a tip swivel ring 102 which allows the tip swivel ring 102 to rotate on the tip swivel ring bearing 82. The tip swivel ring is axially retained on said tip swivel ring bearing 82 by a tip 18 that is affixed to the tip swivel ring bearing 82 by a set screw 92 that engages internal threads on the tip 18 and internal threads of the tip swivel ring bearing 82. An end face of the tip 18 together with the bearing surface 90 and the shoulder 82s define an annular channel 100 for the tip swivel ring 102. The tip swivel ring is also provided with a line guide 106. The line guide 106 may be a ring shaped guide or a roller 108 disposed on a pin 110 held by supports 112 disposed on the tip swivel ring 102. Similar to the rollers 54R, the roller 108 may be a u-shaped or a v-shaped roller. The rollers are preferably brass rollers.

Figure 1C:
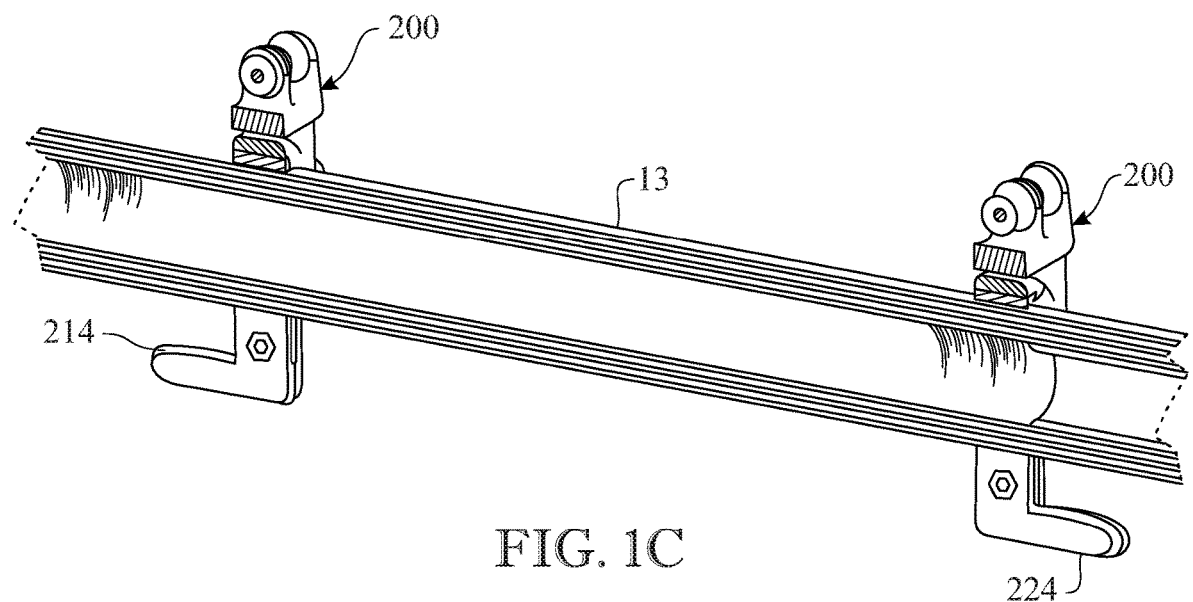
FIG. 1C is an enlarged partial cross section view of the outrigger tube assembly taken longitudinally at the rigging line caddy of FIG. 1B.
Figure 11:
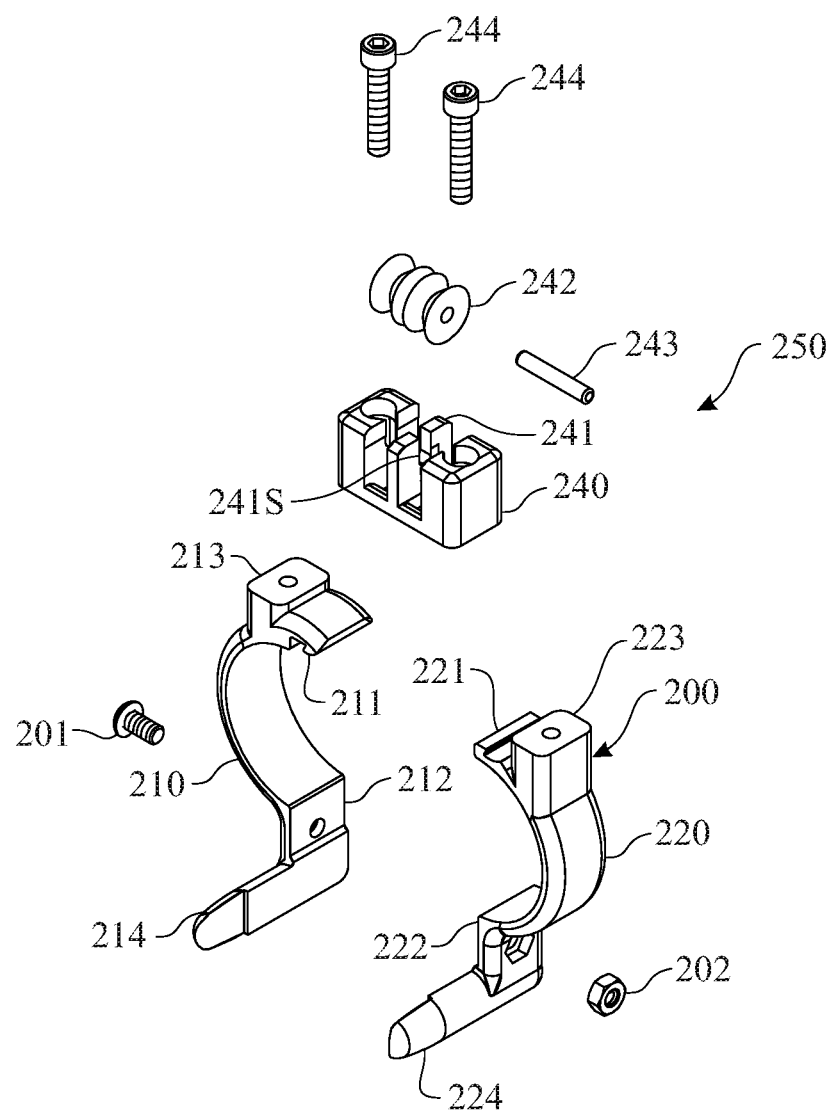
FIG. 11 is an exploded view in perspective of a component of the rigging line caddy assembly.
Figure 12:
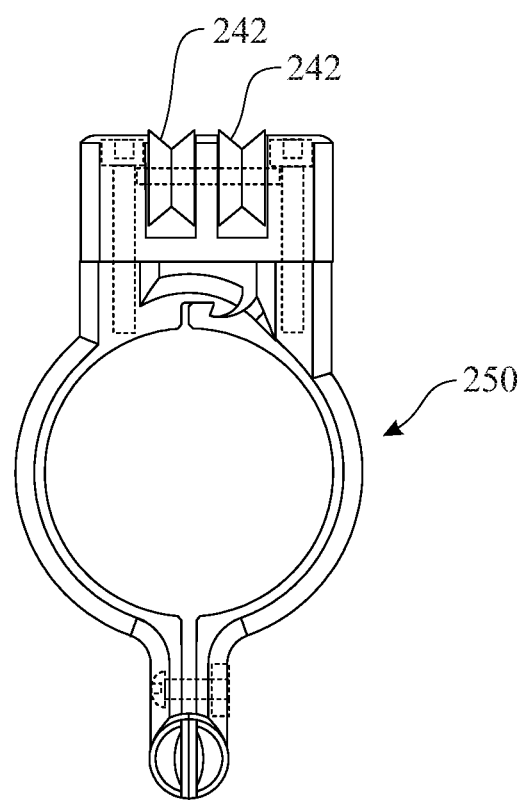
FIG. 12 is a top view of the rigging line caddy assembly of FIG. 11.

FIG. 11 shows a split ring assembly 200 of a rigging line caddy 250. The split ring assembly 200 includes a half ring 210 and a second half ring 220. The half ring 210 is provided with an axial notch feature 211 on an inside diameter of said half ring 210 and the second half ring 220 is provided with a corresponding axial notch feature 221 on an outside diameter of said second half ring 220. Each of the half rings 210 and 220 is provided with a respective tab 212, 222 with an opening for receiving a fastener 201. When installed on the outer tube 13, the notches 211 and 221 engage one another and the tabs 212 and 222 are pivoted together and the fastener 201 is inserted through the respective openings and is secured by a nut 202. Each of the half rings 210, 220 is provided with a respective block 213, 223 with a threaded hole for mounting a roller mounting block 240. The roller mounting block 240 includes walls 241 that delimit rollers 242 from one another and prevent the rigging lines from becoming tangled with one another. The walls 241 each have a respective slot 241s for receiving a pin 243 on which the rollers 242 are mounted in the mounting block 240. Screws 244 are inserted into openings in the two outer walls 241 into the corresponding blocks 213, 223. The pin 243 is clamped by the underside of the head of the screws 244 for securing the pin 243 in the slots 241. FIGS. 11 and 12 show two rollers 242, however three or more rollers 242 (see FIG. 1B) may be used. In such instance, two central or interior walls 241 are provide on the mounting block 240. The distal ends of each of the tabs 212, 222 are provided with a respective axial projection 214, 224. FIG. 1c, shows that the rigging line caddy 250 has two of the split ring assemblies 200 mounted on the outer tube 13. Here, it is also seen that the axial projections 214, 224 project away from one another for wrapping the rigging lines.

Figure 8:
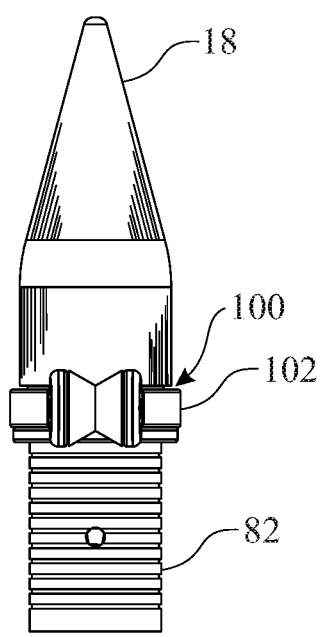
FIG. 8 is a front view of the tip assembly of FIG. 7.
Figure 9:
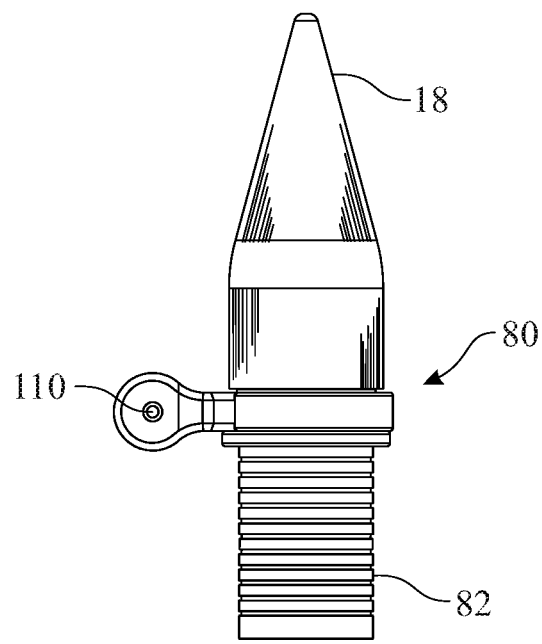
FIG. 9 is a side view of the tip assembly of FIG. 7.
Figure 10:
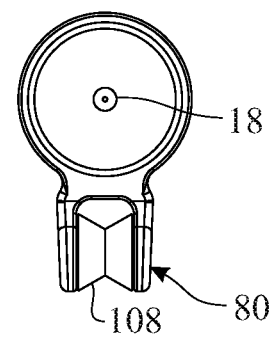
FIG. 10 is a top view of the tip assembly of FIG. 7.

FIG. 1B shows a possible configuration of swivel rings and numbers of rollers progressing longitudinally along the outrigger assembly 1. When setting a spread while trolling, the tip end of the outrigger assembly would require one rigging line. Accordingly, the tip of the outrigger is provided with one roller as shown in FIG. 8. Each of inwardly disposed swivel rings as well as the rigging caddy 250 must accommodate the tip rigging line and have a roller dedicated to this rigging line. The swivel ring disposed on the center tube 12 may be additionally provided with a second rigging line for setting a fishing line at this position. Accordingly, the center tube swivel ring is provided with a second roller and the inwardly disposed swivel ring (on the outer tube 13) and the rigging caddy 250 have second rollers dedicated to the second rigging line. It is also possible that the swivel ring on the outer tube 13 is provided with a third roller for a third rigging line. In this case, the rigging caddy 250 is provided with third rollers as well.

I claim:

1. An outrigger assembly comprising:
   an outrigger tube having a longitudinal axis;
   body line guides disposed on said outrigger tube spaced apart from one another along said longitudinal axis for guiding outrigger rigging lines in a direction along said longitudinal axis, said body line guides each having a set of two respective rollers disposed coaxially with one another on an axis of rotation being orthogonal to said longitudinal axis, said two respective rollers being delimited from one another for respectively guiding the rigging lines adjacent one another;
   said body line guides each being mounted on said outrigger tube by a respective swivel ring disposed on said outrigger tube with a swivel ring bearing disposed on said outrigger tube intermediate said outrigger tube and said swivel ring, each said swivel ring being rotatable with respect to said outrigger tube about said longitudinal axis.

2. The outrigger assembly according to claim 1, wherein said line guides are guide rollers.

3. The outrigger assembly according to claim 2, wherein said rollers are u-shaped or v-shaped rollers.

4. The outrigger assembly according to claim 1, further comprising a tip line guide disposed at a tip end of said outrigger tube, said tip line guide having a single roller, said tip line guide having a further axis of rotation orthogonal to said longitudinal axis, said single roller for guiding one of the rigging lines of the rigging lines that is guided to said tip end.

5. The outrigger assembly according to claim 1, further comprising a tip line guide assembly disposed at a tip end of said outrigger tube, said tip line guide assembly having a further line guide for guiding one of the rigging lines of the rigging lines that is guided to said tip end, said tip line guide assembly having a tip swivel ring carrying said further line guide and being rotatable with respect to said outrigger tube about said longitudinal axis.

6. The outrigger assembly according to claim 5, further comprising a tip swivel ring bearing disposed at said tip end of said outrigger tube, said tip swivel ring bearing defining an annular channel for receiving said tip swivel ring and axially retaining said tip swivel ring therein.

\* \* \* \* \*